United States Patent
Kim et al.

(10) Patent No.: US 9,668,227 B2
(45) Date of Patent: May 30, 2017

(54) METHOD AND APPARATUS FOR CALCULATING POWER HEADROOM IN CARRIER AGGREGATION MOBILE COMMUNICATION SYSTEM

(71) Applicant: Samsung Electronics Co., Ltd., Suwon-si, Gyeonggi-do (KR)

(72) Inventors: Soeng Hun Kim, Suwon-si (KR); Kyeong In Jeong, Hwaseong-si (KR); Sang Bum Kim, Seoul (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/879,094

(22) Filed: Oct. 8, 2015

(65) Prior Publication Data
US 2016/0037465 A1 Feb. 4, 2016

Related U.S. Application Data

(63) Continuation of application No. 14/860,106, filed on Sep. 21, 2015, which is a continuation of application
(Continued)

(30) Foreign Application Priority Data

Nov. 2, 2011 (KR) ........................ 10-2011-0113227

(51) Int. Cl.
*H04B 7/00* (2006.01)
*H04W 52/36* (2009.01)
(Continued)

(52) U.S. Cl.
CPC ..... *H04W 52/365* (2013.01); *H04W 72/0413* (2013.01); *H04L 5/001* (2013.01); *H04W 52/367* (2013.01); *H04W 84/045* (2013.01)

(58) Field of Classification Search
CPC ............. H04W 52/365; H04W 52/146; H04W 52/0229; H04W 24/10; H04W 72/00;
(Continued)

(56) References Cited

U.S. PATENT DOCUMENTS

2010/0158147 A1 6/2010 Zhang et al.
2010/0232385 A1 9/2010 Hsu
(Continued)

FOREIGN PATENT DOCUMENTS

CN 101340711 A 1/2009
CN 101715207 A 5/2010
(Continued)

OTHER PUBLICATIONS

ZTE; Discussion on CC specific PHR reporting; 3GPP TSG RAN WG2 #70bis; R2-103724; Jun. 28-Jul. 2, 2010; Stockholm, Sweden.
(Continued)

*Primary Examiner* — Shaima Q Aminzay
(74) *Attorney, Agent, or Firm* — Jefferson IP Law, LLP

(57) ABSTRACT

A power headroom calculation method and apparatus of a User Equipment (UE) are provided for a primary cell Power Headroom (PH) calculation in a Long Term Evolution-Advanced (LTE-A) mobile communication system. The method includes determining whether an activated serving cell includes uplink data and/or uplink control signal to be transmitted, and determining PH of the activated serving cell according to whether the activated serving cell has the uplink data and/or uplink control signal.

8 Claims, 8 Drawing Sheets

Related U.S. Application Data

No. 13/289,489, filed on Nov. 4, 2011, now Pat. No. 9,144,038.

(60) Provisional application No. 61/410,493, filed on Nov. 5, 2010.

(51) Int. Cl.
*H04W 72/04* (2009.01)
*H04L 5/00* (2006.01)
*H04W 84/04* (2009.01)

(58) Field of Classification Search
CPC ......... H04W 72/0473; H04W 72/1268; H04W 72/0413; H04W 74/006; H04W 88/02; H04W 88/08; H04L 5/001
USPC .......... 455/522, 67.11, 423, 509, 550.1, 561, 455/571; 370/252, 318, 328, 329
See application file for complete search history.

(56) References Cited

U.S. PATENT DOCUMENTS

| | | |
|---|---|---|
| 2010/0238863 A1 | 9/2010 | Guo et al. |
| 2010/0297993 A1 | 11/2010 | Heo et al. |
| 2011/0092217 A1 | 4/2011 | Kim et al. |
| 2011/0242972 A1 | 10/2011 | Sebire et al. |
| 2011/0245142 A1 | 10/2011 | Gizaw et al. |
| 2012/0294167 A1 | 11/2012 | Zhu et al. |

FOREIGN PATENT DOCUMENTS

| | | |
|---|---|---|
| CN | 101778416 A | 7/2010 |
| JP | 2013-524037 A | 6/2013 |
| KR | 10-2009-0131653 A | 12/2009 |
| KR | 10-2010-0106246 A | 10/2010 |
| WO | 2010/065759 A2 | 6/2010 |
| WO | 2010/091425 A2 | 8/2010 |
| WO | 2010/104957 A2 | 9/2010 |

OTHER PUBLICATIONS

HTC, "Power Headroom Reporting", 3GPP TSG-RAN WG1 #61, R1-102732, May 10-14, 2010.

Mediatek, "Per UE PHR for carrier aggregation", 3GPP TSG-RAN WG1Meeting #61bis, R1-103743, Jun. 28-Jul. 2, 2010.

Nokia Siemens Networks et al.; Further consideration on virtual PHR; 3GPP TSG-RAN WG2 Meeting #71; R2-104394; Aug. 23-27, 2010; Madrid, Spain, See Parent U.S. Appl. No. 14/860,106.

ITRI; Considerations on the remaining issues of PHR; 3GPP TSG RAN WG2 #71; R2-104893; Aug. 23-27, 2010; Madrid, Spain, See Parent U.S. Appl. No. 14/860,106.

Ericsson; Summary of e-mail discussion [71#57] LTE CA; PHR Reporting; 3GPP TSG-RAN WG2 #71bis; Tdoc R2-105462; Oct. 11-15, 2010; Xian, China, See Parent U.S. Appl. No. 14/860,106.

Alcatel-Lucent et al.; Discussion on PHR remaining issues; 3GPP TSG-RAN WG2 Meeting #71b; R2-105648; Oct. 11-15, 2010; Xian, China, See Parent U.S. Appl. No. 14/860,106.

Ericsson et al.; Details of PHR Handling for CA; 3GPP TSG-RAN WG2 #70bis; Tdoc R2-103570; Jun. 28-Jul. 2, 2010; Stockholm, Sweden.

ZTE; Parallel transmission of two types PHR; 3GPP TSG RAN WG2 #70bis; R2-103725; Jun. 28-Jul. 2, 2010; Stockholm, Sweden.

LG Electronics Inc.; PHR format for CA; 3GPP TSG-RAN2 Meeting #70bis; R2-103937; Jun. 28-Jul. 2, 2010; Stockholm, Sweden.

Mediatek; Further details for Rel-10 PHR; 3GPP TSG-RAN WG2 Meeting #71bis; R2-105444; Oct. 11-15, 2010; Xi'an, China.

METHOD AND APPARATUS FOR CALCULATING POWER HEADROOM IN CARRIER AGGREGATION MOBILE COMMUNICATION SYSTEM

CROSS-REFERENCE TO RELATED APPLICATION

This application is a continuation application of prior application Ser. No. 14/860,106, filed on Sep. 21, 2015, which is a continuation application of prior application Ser. No. 13/289,489, filed on Nov. 4, 2011, which issued as U.S. Pat. No. 9,144,038 on Sep. 22, 2015 and claimed the benefit under 35 U.S.C. §119(e) of a U.S. provisional patent application filed on Nov. 5, 2010 in the United States Patent and Trademark Office and assigned Ser. No. 61/410,493, and under 35 U.S.C. §119(a) of a Korean patent application filed on Nov. 2, 2011 in the Korean Intellectual Property Office and assigned Serial No. 10-2011-0113227, the entire disclosure of which is hereby incorporated by reference.

BACKGROUND OF THE INVENTION

1. Field of the Invention

The present invention relates to a power headroom calculation method and apparatus. More particularly, the present invention relates to a power headroom calculation method and apparatus of a User Equipment (UE) for a primary cell in a Long Term Evolution-Advanced (LTE-A) mobile communication system.

2. Description of the Related Art

Mobile communication systems have been developed to provide subscribers with voice communication services on the move. With the rapid advance of technologies, the mobile communication systems have evolved to support high speed data communication services as well as the standard voice communication services.

Recently, as the next generation mobile communication system of the 3$^{rd}$ Generation Partnership Project (3GPP), a Long Term Evolution (LTE) system is has been developed. The LTE system is a technology for implementing high-speed packet-based communication at about 100 Mbps that has been available commercially around 2010. Regarding commercialization of the LTE system, a discussion is being held on several schemes such as, one scheme for reducing the number of nodes located in a communication path by simplifying a configuration of a network, and another scheme for maximally approximating wireless protocols to wireless channels.

Unlike voice service, data service is characterized in that a resource is allocated according to the data amount to be transmitted and channel condition. Accordingly, in the wireless communication system such as a cellular communication system, a scheduler manages resource allocation in consideration of the resource amount, channel condition, and data amount. This is also the case in the LTE system as one of the next generation mobile communication systems such that the scheduler located in the base station manages and allocates a radio resource.

Recently, a LTE-Advanced (LTE-A) system has been actively discussed as an evolution of the LTE system with new techniques to increase a data rate. Carrier Aggregation (CA) is one technique that has been newly adopted in the LTE-A system. Unlike data communication according to the related art in which a User Equipment (UE) uses a single uplink carrier and a single downlink carrier, the CA enables the UE to use multiple uplink and/or downlink carriers.

Since an uplink transmission power determination algorithm according to the related art is designed for the UE operating with one uplink carrier and one downlink carrier, it is difficult to apply a transmission power determination process according to the related art for uplink transmission power determination of the UE supporting the CA. More particularly, there is a need for a procedure and method for reporting Power Headroom (PH) of the UE supporting the CA.

SUMMARY OF THE INVENTION

Aspects of the present invention are to address at least the above-mentioned problems and/or disadvantages and to provide at least the advantages described below. Accordingly, an aspect of the present invention is to provide a Power Headroom (PH) calculation method and apparatus of a User Equipment (UE) that is capable of calculating the PH more efficiently.

In accordance with an aspect of the present invention, a method for calculating PH of a terminal in a mobile communication system supporting aggregation of multiple serving cells is provided. The method includes determining whether the terminal transmits at least one of uplink data and uplink control signal in an activated serving cell, and calculating PH for the activated serving cell according to whether the terminal transmits the at least one of the uplink data and uplink control signal in the activated serving cell.

In accordance with another aspect of the present invention, an apparatus for calculating PH of a terminal in a mobile communication system support aggregation of multiple serving cells is provided. The apparatus includes a controller for determining whether the terminal transmits at least one of uplink data and uplink control signal in an activated serving cell, and a calculator for calculating PH for the activated serving cell according to whether the terminal transmits the at least one of the uplink data and uplink control signal in the activated serving cell.

In accordance with a further aspect of the present invention, a method for receiving PH of a base station in a mobile communication system supporting aggregation of multiple serving cells is provided. The method includes receiving an extended PH Report (PHR) from a terminal, and determining PH for an activated serving cell by analyzing the extended PHR, wherein the terminal calculates the PH for the activated serving cell according to whether the terminal transmits at least one of uplink data and uplink control signal in the activated serving cell.

In accordance with still another aspect of the present invention, an apparatus for receiving PH of a base station in a mobile communication system supporting aggregation of multiple serving cells is provided. The apparatus includes a receiver for receiving an extended PHR transmitted by a terminal, and a controller for determining PH for an activated serving cell by analyzing the extended PHR, wherein the terminal calculates the PH for the activated serving cell according to whether the terminal transmits at least one of uplink data and uplink control signal in the activated serving cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a Power Headroom (PH) calculation method and apparatus of a User Equipment (UE) for a Primary Cell (PCell) in a Long Term Evolution-Advanced (LTE-A) mobile communication system.

Unlike the method according to the related art in which only one of Physical Uplink Shared Channel (PUSCH) and Physical Uplink Control Channel (PUCCH) can be transmitted for a preset time duration, the LTE-A mobile communication system is capable of transmitting PUSCH and PUCCH simultaneously in an uplink. Accordingly, it is necessary to calculate PH differently depending on whether the PUSCH is transmitted with or without the PUCCH. An exemplary embodiment of the present invention provides an efficient PH calculation method when the PUSCH and the PUCCH are transmitted simultaneously.

Figure 1:
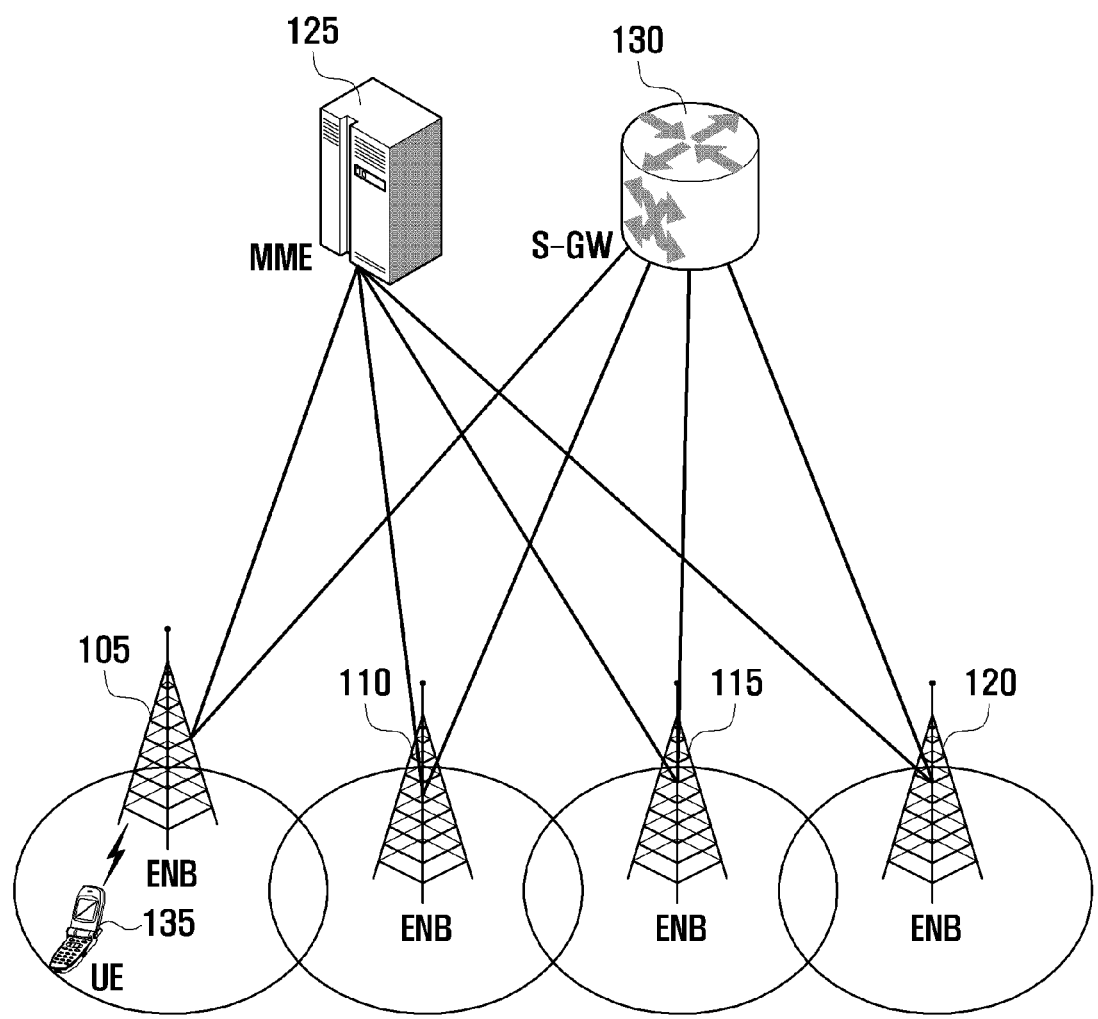
FIG. 1 is a diagram illustrating a mobile communication system according to an exemplary embodiment of the present invention.
Figure 2:
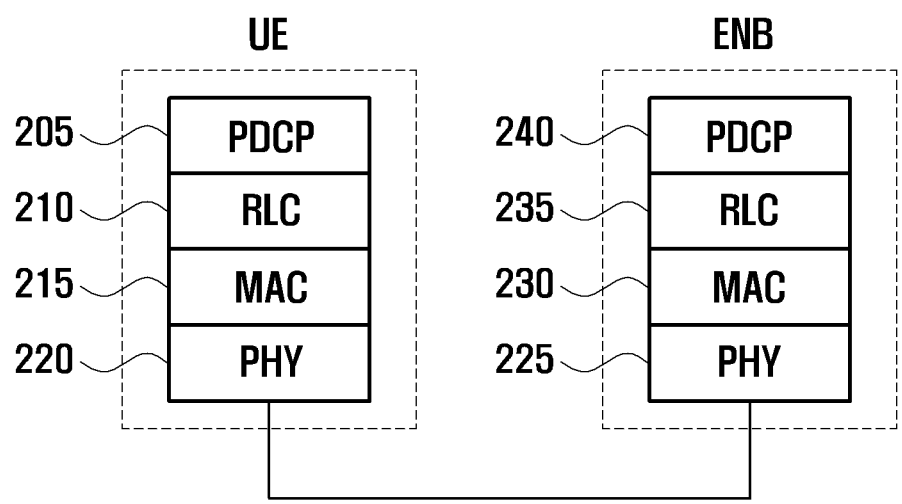
FIG. 2 is a diagram illustrating a protocol stack of a mobile communication system according to an exemplary embodiment of the present invention.
Figure 3:
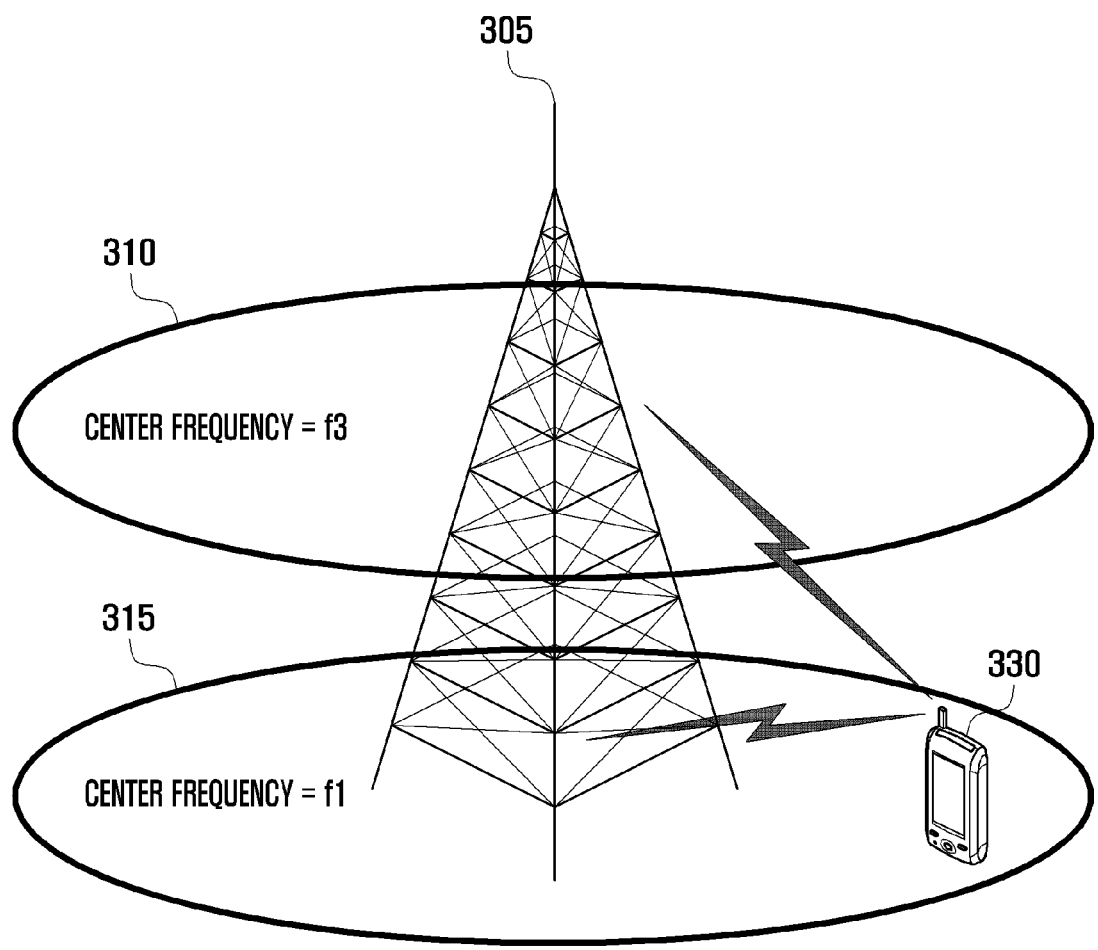
FIG. 3 is a diagram illustrating Carrier Aggregation (CA) in a mobile communication system according to an exemplary embodiment of the present invention.

Prior to explaining the present invention, a description is made of a mobile communication system to which exemplary embodiments of the present invention are applied with reference to FIGS. 1, 2, and 3. In the following, the description is directed to a case of a LTE system.

FIG. 1 is a diagram illustrating a mobile communication system according to an exemplary embodiment of the present invention.

Referring to FIG. 1, a radio access network of the mobile communication system includes evolved Node Bs (eNBs) 105, 110, 115, and 120, a Mobility Management Entity (MME) 125, and a Serving-Gateway (S-GW) 130. The UE 135 connects to an external network via eNBs 105, 110, 115, and 120 and the S-GW 130.

The eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information of the UEs. In order to implement the data rate of up to 100 Mbps, the LTE system adopts Orthogonal Frequency Division Multiplexing (OFDM) as a radio access technology. Also, the LTE system adopts Adaptive Modulation and Coding (AMC) to determine a modulation scheme and channel coding rate in adaptation to the channel condition of the UE. The S-GW 130 is an entity to provide data bearers to establish and release data bearers under the control of the MME 125. The MME 125 is responsible for various control functions and connected to a plurality of eNBs 105, 110, 115, and 120.

FIG. 2 is a diagram illustrating a protocol stack of a mobile communication system according to an exemplary embodiment of the present invention.

Referring to FIG. 2, the protocol stack of the LTE system includes Packet Data Convergence Protocol (PDCP) layer 205 and 240, Radio Link Control (RLC) layer 210 and 235, Medium Access Control (MAC) layer 215 and 230, and Physical (PHY) layer 220 and 225. The PDCP layer 205 and 240 is responsible for Internet Protocol (IP) header compression/decompression. The RLC layer 210 and 235 is responsible for segmenting the PDCP Protocol Data Unit (PDU) into segments in an appropriate size for an Automatic Repeat Request (ARQ) operation. The MAC layer 215 and 230 is responsible for establishing connection to a plurality of RLC entities to multiplex the RLC PDUs into MAC PDUs and demultiplex the MAC PDUs into RLC PDUs. The PHY layer 220 and 225 perform channel coding on the MAC PDU and modulate the MAC PDU into OFDM symbols to transmit over a radio channel or perform demodulating and channel-decoding on the received OFDM symbols and deliver the decoded data to a higher layer. In view of transmission, the data input to a protocol entity is referred to as a Service Data Unit (SDU), and the data output by the protocol entity is referred to as a Protocol Data Unit (PDU).

A description is made of Carrier Aggregation (CA) hereinafter with reference to FIG. 3.

FIG. 3 is a diagram illustrating CA in a mobile communication system according to an exemplary embodiment of the present invention.

Referring to FIG. 3, an eNB can use multiple carriers transmitted and receive in different frequency bands. For example, the eNB 305 can be configured to use the carrier 315 with center frequency f1 and the carrier 310 with center frequency f3. If CA is not supported, the UE 330 has to transmit/receive a data unit of one of the carriers 310 and 315. However, the UE 330 having the CA capability can transmit/receive data using both of the carriers 310 and 315. The eNB can increase the amount of resource to be allocated to the UE having the CA capability in adaptation to the channel condition of the UE to improve the data rate of the UE. In a case in which a cell is configured with one downlink carrier and one uplink carrier as a concept according to the related art, the CA can be understood as if the UE communicates data via multiple cells. With the use of CA, a maximum data rate increases in proportion to the number of aggregated carriers. The aggregated carriers are configured via Radio Resource Control (RRC) signaling. In an LTE system, it is possible to add or remove a carrier to or from the CA using an RRCConnectionReconfiguration message. Although a specific carrier is configured, data transmission is not performed yet. In order to use the corresponding carrier, it is necessary to activate the carrier by Medium Access Control (MAC) signaling. In the LTE system, the configured carrier is activated by a MAC Control Element (CE) in the MAC PDU. Since the service is provided through multiple activated carriers, there exist multiple serving cells.

Meanwhile, in order to mitigate interference, the uplink transmission power may be maintained below an appropriate level. For this purpose, the UE determines the uplink transmission power using a preset function and performs uplink transmission at the determined uplink transmission power. For example, the UE determines the required uplink transmission power value by inputting input values such as scheduling information including a resource amount, Modulation and Coding Scheme (MCS) allocated to the UE and information necessary for estimating a channel condition such as path loss, and performs uplink transmission by applying the determined uplink transmission power value. The available uplink transmission power value of the UE is limited to a maximum transmission power value of the UE such that when the determined transmission power value exceeds the maximum transmission power value the UE performs the uplink transmission at the maximum transmission power. In this case, the uplink transmission power is not enough, resulting in uplink transmission quality degradation. Accordingly, the eNB may perform scheduling such that the required transmission power does not exceed the maximum transmission power. However, since a few parameters such as path loss cannot be verified by the eNB, the UE has to report its PH value to the eNB by means of a PH Report (PHR).

There are several factors influencing PH such as, 1) allocated transmission resource amount, 2) MCS to be applied to uplink transmission, 3) Path Loss (PL) of the related downlink carrier, and 4) accumulated value of transmission power control command. Among them, the PL and accumulated transmission power control command value are variable according to the uplink carrier such that, when multiple uplink carriers are aggregated, the transmission of PHR may be configured per carrier. However, in order to transmit the PHR efficiently, it can be advantageous to reports the PHs of all the uplink carriers on one uplink carrier. Depending on a management policy, it may be necessary to transmit the PH of the carrier on which actually no PUSCH transmission takes place. In this case, it can be more efficient to report the PHs of the multiple uplink carriers on a single uplink carrier. For this purpose, it is necessary to extend the PHR according to the related art. The multiple PHs carried by a PHR can be arranged in a preset order.

Figure 4:
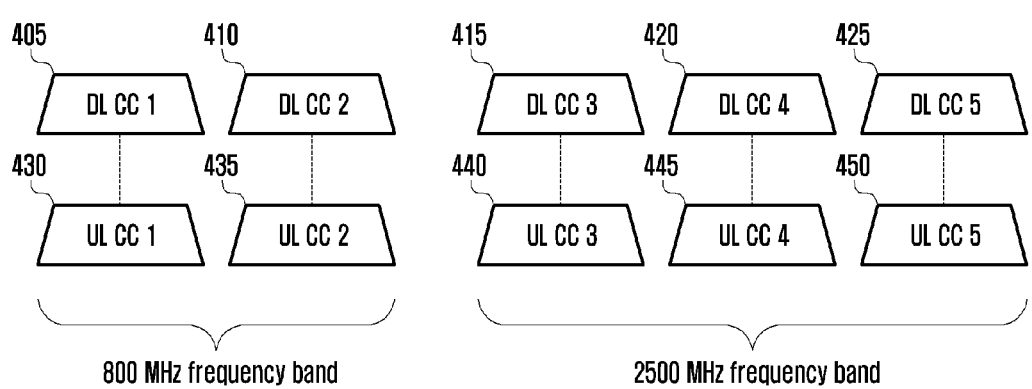
FIG. 4 illustrates a principle of CA for use in a mobile communication system according to an exemplary embodiment of the present invention.

FIG. 4 illustrates a principle of CA for use in a mobile communication according to an exemplary embodiment of the present invention.

Referring to FIG. 4, five downlink carriers can be aggregated for the UE including downlink carrier 1 405, downlink carrier 2 410, downlink carrier 3 415, downlink carrier 4 420, and downlink carrier 5 425. Similarly, five uplink carriers can be aggregated for the UE including uplink carrier 1 430, uplink carrier 2 435, uplink carrier 3 440, uplink carrier 4 445, and uplink carrier 5 450. Here, one of the aggregated carriers can be selected to transmit the PHs for the five 5 uplink carriers. For example, when three uplink carriers 440, 445, and 450 are aggregated for the UE, a PHR can be configured to carry the PHs for the three uplink carriers.

The PHR is triggered when path loss of a connected downlink carrier is equal to or greater than a preset threshold value, or a prohibit PHR time expires or a preset time period elapses after the PHR generation. Once the PHR has triggered, the UE waits until the time available for the uplink transmission arrives, e.g., the time for which the uplink transmission resource is allocated, rather than transmits the PHR immediately. This is because the PHR is not the information that is very sensitive to delay. The UE transmits the PHR at the first uplink transmission. The PHR is MAC layer control information and has the length of 8 bits. The first two bits of the PHR are reserved for future use, and the remaining 6 bits are used to indicate the value in the range between −23 dB and 40 dB as the PH of the UE. The UE calculates the PH using the following Equation:

$$PH(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\} \qquad (1)$$

The PH(i) of the $i^{th}$ subframe in a serving cell c is determined with a maximum uplink transmission power $P_{CMAX,c}(i)$, number of resource blocks $M_{PUSCH,c}(i)$, power offset derived from MCS $\Delta_{TF,c}$, Path Loss $PL_c$, and accumulated TPC commands $f_c(i)$. In Equation (1), $PL_c$ denotes the pass loss of a cell which provides information on the path loss in the serving cell c. The path loss used to determine uplink transmission power of a certain serving cell is the path loss of the downlink channel of a corresponding cell or the path loss of a downlink channel of another cell. The cell of which the path loss is to be used is selected by the eNB and notified to the UE in the call setup process. In equation (1), $f_c(i)$ is an accumulated value of accumulated Transmission Power Control (TPC) commands of the serving cell c. The parameter $P_{O\_PUSCH,C}$ denotes a higher layer parameter corresponding to the sum of cell-specific and UE-specific values. Typically, $P_{O\_PUSCH,C}$ is set to a value determined depending on the transmission type of PUSCH such as the semi-persistent scheduling, dynamic scheduling, and random access response. The parameter $\alpha_c$ denotes a 3-bit cell specific value provided from a higher layer as weight applied to the path loss when determining uplink transmission power (i.e., the higher this value is, the more the path loss influences the uplink transmission power), and its value is limited according to the transmission type of the PUSCH. The parameter j denotes the transmission type of the PUSCH. The parameter j is set to 0 for semi-persistent scheduling, 1 for dynamic scheduling, and 2 for random access response. If there is no PUSCH transmission, $M_{PUSCH}$ and $\Delta_{TF}$ are not applied to Equation (1).

In a mobile communication system supporting CA, there can be a serving cell in which no PUSCH transmission takes place and a serving cell in which PUSCH transmission takes place. Also, the PH for a serving cell can be reported in another serving cell. In the mobile communication system supporting CA, when it is necessary to report the PHs of multiple serving cells, the UE can transmit the PHs in a single PHR. This method is advantageous to reduce signaling overhead as compared to the method transmitting the PHs individually, and the eNB can acquire the PH for the carrier on which no PUSCH is transmitted.

Figure 5:
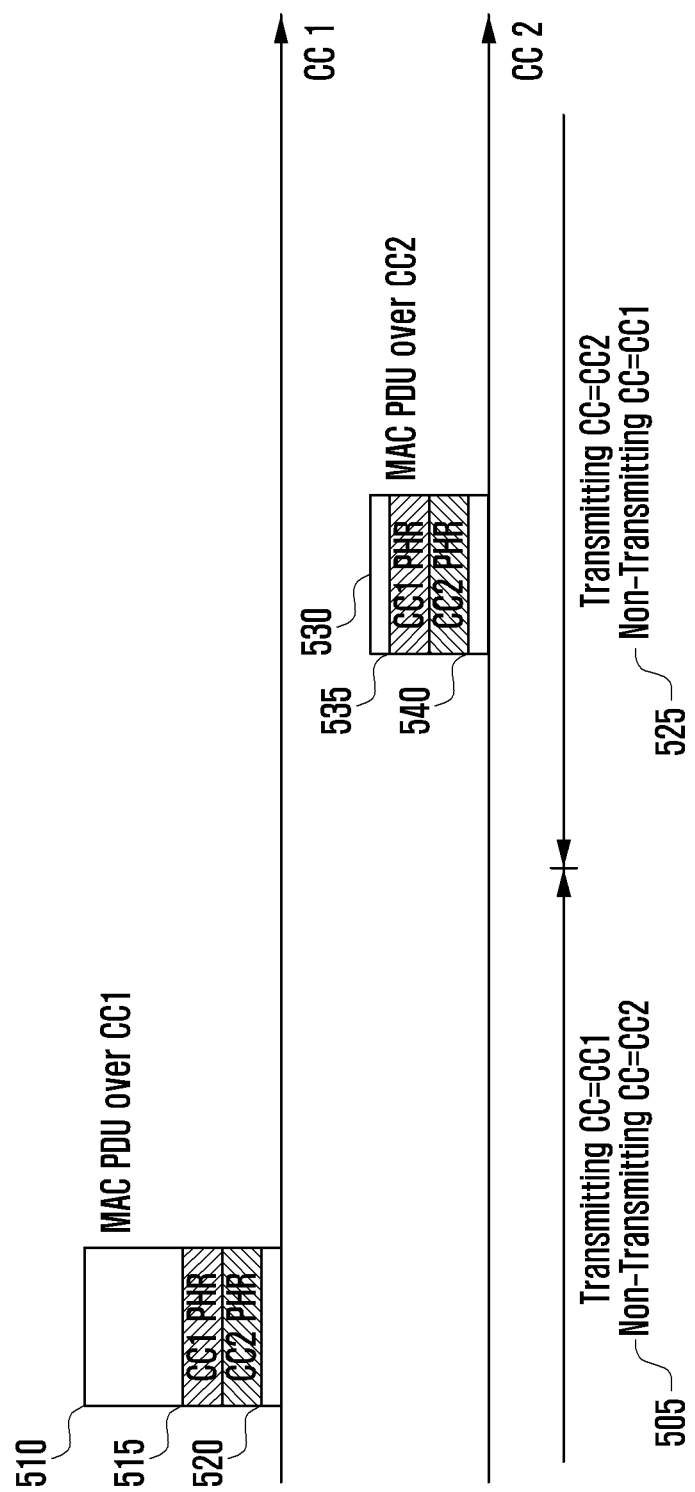
FIG. 5 is a diagram illustrating Power Headroom (PH) reporting according to an exemplary embodiment of the present invention.

FIG. 5 is a diagram illustrating PH reporting according to an exemplary embodiment of the present invention.

Referring to FIG. 5, the diagram illustrates two serving cells CC1 and CC2 that transmits the PHs of both the serving cells. In a time duration 505 for which PUSCH transmission takes place in CC1 but not in CC2, a UE can transmit a MAC PDU 510 containing the CC1 PH 515 and CC2 PH 520. Also, in the time duration 525 for which PUSCH transmission takes place in CC2 but not in CC1, the UE can transmit a MAC PDU 530 containing the CC1 H 535 and CC2 PH 540.

An exemplary extended PHR includes PHs of a plurality of carriers, and each PH can be included selectively. Accordingly, the length of the extended PHR varies according to the situation. With the introduction of a new PHR format in addition to a legacy PHR format, a new Locale IDentifier (LCID) is defined to identify the extended PHR for discrimination purposes. Since the length of the extended PHR is variable, it is necessary to add a parameter L indicating the length of the extended PHR. Depending on whether the PUSCH and PUCCH are transmitted simultaneously in a Primary Cell (PCell), the type 2 PH can be included. The extended PHR also includes PHs of activated Serving Cells (SCells). Since the extended PHR varies in size depending on the situation, the parameter L indicating the length of the extended PHR is inserted in a sub-header. Unlike the PCell, the SCell does not support simultaneous transmission of the PUSCH and the PUCCH, type 2 PH for a SCell does not exist. The PHs of individual carriers are arranged in order of the type 2 PH for the PCell→type 1 PH for the PCell→PHs of an activated SCell in ascending order of SCell indices. By taking notice of the fact that the type 2 PH exists only for the PCell and can be interpreted correctly with the type 1 PH, the PH of the PCell may be arranged at the beginning Here, the type 2 PH is used when the PUSCH and the PUCCH are transmitted simultaneously. Upon receipt of the extended PHR, the recipient device acquires the information on the PH for PUSCH transmission and the PH for PUCCH transmission in the PCell based on the type 2 PH and type 1 PH and processes the same type of PHs, i.e., type 1 PHs at a time, resulting in reduction of processing overhead.

Although there is no real PUSCH transmission, the eNB can trigger the PHR to acquire the path loss information on a specific uplink carrier. If the PHR is triggered for a specific SCell, the UE determines a PH calculation rule according to whether there is PUSCH transmission in the corresponding SCell. If there is PUSCH transmission in the serving cell, the UE calculates PH according to the method according to the related art using Equation (1). If there is no PUSCH transmission in the serving cell, this means that a transmission resource is not allocated and it is not clear which $M_{PUSCH}$ and $\Delta_{TF}$ should be used, such that a device for the eNB and UE to calculate and interpret the PH using the same of $M_{PUSCH}$ and $\Delta_{TF}$. This problem can be solved with a fixed transmission format (i.e., transmission resource amount and MCS level) for use in PH calculation in case of no PUSCH transmission that is agreed between the UE and the eNB. Assuming that the reference transmission format is a combination of 1 Resource Block (RB) and lowest MCS level, both the $M_{PUSCH}$ and $\Delta_{TF}$ are set to 0 and this has the same meaning of omission of these parameters in Equation (1). Since there is no real data transmission in the corresponding serving cell, $P_{CMAX,c}(i)$ does not exist. Accordingly, it is necessary to determine the value of $P_{CMAX,c}(i)$. For such a virtual transmission, virtual $P_{CMAX,c}(i)$ is defined and adopted. The $P_{CMAX,c}(i)$ can be determined using the maximum allowed UE output power $P_{EMAX}$ and nominal UE power $P_{PowerClass}$. For example, the $P_{CMAX,c}(i)$ can be determined as Equation (2):

$$P_{CMAX,c} = \min\{P_{EMAX}, P_{PowerClass}\} \quad (2)$$

$P_{CMAX}$ has the relationship of $P_{CMAX\_L} \leq P_{CMAX} \leq P_{PowerClass}$. Here, if zero power back-off is considered, $P_{CMAX\_L} = P_{CMAX\_H}$ and thus $P_{CMAX} = P_{CMAX\_H}$. At this time, $P_{CMAX}$ is the least one of $P_{PowerClass}$ and $P_{EMAX}$. $P_{EMAX}$ is a cell-specific maximum allowed UE transmission power, and $P_{PowerClass}$ is a UE-specific maximum allowed power.

As described above, the LTE-A mobile communication system allow simultaneous PUSCH and PUCCH transmission. Accordingly, it is necessary to use different PH information for PUSCH-only transmission and simultaneous PUSCH and PUCCH transmission.

Figure 6:
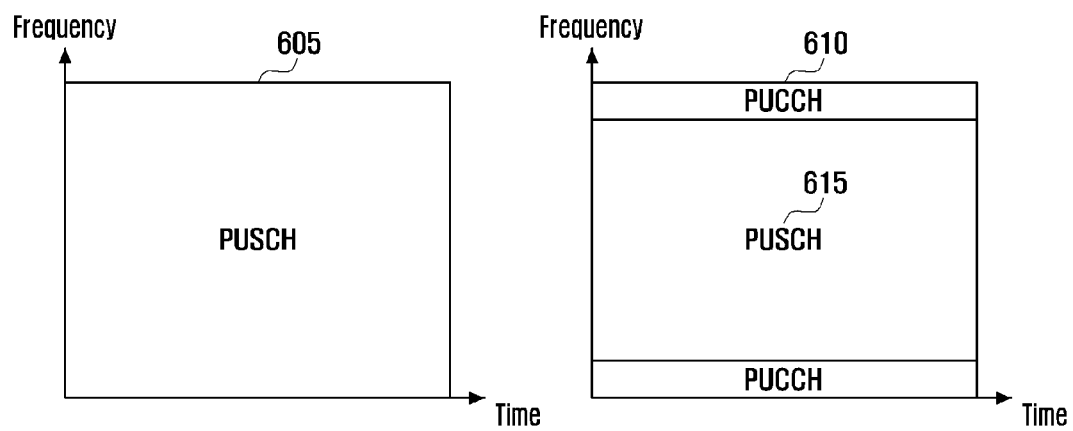
FIG. 6 is a diagram illustrating resource allocations for Physical Uplink Shared Channel (PUSCH)-only transmission and simultaneous PUSCH and Physical Uplink Control Channel (PUCCH) transmission according to an exemplary embodiment of the present invention.

FIG. 6 is a diagram illustrating resource allocations for PUSCH-only transmission and simultaneous PUSCH and PUCCH transmission according to an exemplary embodiment of the present invention. In FIG. 6, the left diagram illustrates the resource allocated entirely for PUSCH 605, and the right diagram illustrates the resource allocated for PUSCH 615 and PUCCH 610. Here, a horizontal axis is a time axis, and a vertical axis is a frequency axis.

Referring to FIG. 6, when both the PUSCH and PUCCH are transmitted, transmit powers allocated for the PUSCH and PUCCH should be excluded from the maximum transmission power of a UE to calculate PH. In a case in which the PUSCH and the PUCCH are transmitted simultaneously, an eNB notifies the UE prior to the transmission of the PUSCH configuration. In order to provide the PHs for PUSCH-only transmission and simultaneous PUSCH and PUCCH transmission, type 1 PH and type 2 PH are used. The type 1 PH is defined as $P_{CMAX}-P_{PUSCH}$. Here, $P_{PUSCH}$ denotes the transmit power allocated for PUSCH. The type 2 PH is defined as $P_{CMAX}-P_{PUSCH}-P_{PUCCH}$. Here, $P_{PUCCH}$ denotes the transmit power allocated for PUCCH. If simultaneous PUSCH and PUCCH transmission is not indicated in the PUCCH configuration, only the type 1 PH is used. Otherwise, both the type 1 PH and type 2 PH are used. The type 2 PH is used for a PCell in a CA system but not for a SCell. If the simultaneous PUSCH and PUCCH transmission is indicated in the PUCCH configuration, both the type 1 PH and type 2 PH for the PCell are included in a PHR.

As described above, the eNB can trigger the PHR, even when no PUSCH (or PUCCH) transmission is scheduled, in order to acquire the path loss information on a specific uplink carrier. Although simultaneous the PUSCH and the PUCCH transmission is indicated in the PUCCH configuration, any or both of PUSCH and PUCCH may not be transmitted for specific time duration. In the CA system having a plurality of serving cells, if at least one serving cell fulfills the PHR trigger condition, the PHs of all activated cells in which uplink carriers are configured are generated and reported to the eNB. Here, the uplink channels of the PCell can be in one of the four states:

PUSCH and PUCCH transmission state
PUSCH-only transmission state
PUCCH-only transmission state
Non-uplink transmission state It is necessary to calculate the type 1 PH and type 2 PH depending on the uplink channel transmission state. An exemplary embodiment of the present invention provides a method for calculating PHs depending on the uplink transmission state as follows. In the following description, the term "real $P_{CMAX}$" denotes the $P_{CMAX}$ determined by taking notice of a real uplink transmission, and the term "reference $P_{CMAX}$" denotes the $P_{CMAX}$ determined under the assumption that the back-off parameters such as Maximum Power Reduction (MPR) and Additional-MPR (A-MPR) are set to 0.

Case 1) PUSCH and PUCCH transmission state

Type 1 PH=real $P_{CMAX}$–real PUSCH power

Type 2 PH=real $P_{CMAX}$–real PUSCH power–real PUCCH power

Case 2) PUSCH-only transmission state

Type 1 PH=real $P_{CMAX}$–real PUSCH power

Type 2 PH=real $P_{CMAX}$–real PUSCH power–virtual PUCCH power

Case 3) PUCCH-only transmission state

Type 1 PH=reference $P_{CMAX}$–virtual PUSCH power

Type 2 PH=real $P_{CMAX}$–virtual PUSCH power–real PUCCH power

Case 4) non-uplink transmission state

Type 1 PH=reference $P_{CMAX}$–virtual PUSCH power

Type 2 PH=reference $P_{CMAX}$–virtual PUSCH power–virtual PUCCH power

Here, the real PUSCH power and real PUCCH power denote the transmit powers required for respective real PUSCH and PUCCH transmissions in the PCell, and the virtual PUSCH power and virtual PUCCH power denotes transmit powers determined using a preset transmission format regardless of no PUSCH and PUCCH transmissions in the PCell. In a case in which there are real uplink transmissions in the PCell, the real $P_{CMAX}$ obtained by taking notice of the real uplink transmission is configured as $P_{CMAX}$. In an exceptional case where only the PUCCH is transmitted, the type 1 PH is calculated using the reference $P_{CMAX}$ while the type 2 PH is calculated using the real $P_{CMAX}$. This is because the PUSCH transmission can be performed anywhere within the cell frequency band depending on the scheduling decision while the PUCCH transmission can be performed in a limited region of the cell frequency band, i.e. both edges of the cell frequency band. If the type 1 PH is calculated with the real $P_{CMAX}$ regardless of the PUCCH-only transmission, $\Delta T_C$ is applied unnecessarily, resulting in distortion of the type 1 PH. Since a reverse is not working (i.e., although the type 2 PH is calculated with real $P_{CMAX}$ in the PUSCH-only transmission case, no distortion takes place in the type 2 PH calculation), both the type 1 PH and type 2 PH are calculated with the real $P_{CMAX}$ in case 2).

To determine the $P_{CMAX}$ by taking notice of the PUSCH and/or PUCCH transmission is to determine the $P_{CMAX}$ according to the method specified in the 3GPP TS36.101 standard. In more detail, when determining $P_{CMAX}$, the parameters of the MPR, the A-MPR, Power Management-Maximum Power Reduction (P-MPR), and $\Delta T_C$ are determined by taking notice of the modulation and transmission bandwidth and an Adjacent Channel Leakage Ratio (ACLR) and spectrum emission requirements in the corresponding channel. The UE determines $P_{CMAX}$ in the following range.

$P_{CMAX\_L} \leq P_{CMAX} \leq P_{CMAX\_H}$

Here, $P_{CMAX\_L} = \text{MIN}\{PEMAX-T_C, P_{PowerClass}-\text{MAX}(MPR+A\text{-MPR}, P\text{-MPR})-TC\}$ $P_{CMAX\_H} = \text{MIN}\{P_{EMAX}, P_{PowerClass}\}$ $P_{CMAX}$ is a cell-specific maximum allowed transmission power, and $P_{PowerClass}$ is the UE-specific maximum allowed power.

The MPR is determined based on a modulation scheme and transmission bandwidth for the channel.

The A-MPR is determined in consideration of the ACLR and spectrum emission requirements.

The P-MPR is a value for power management, and $T_C$ is an operating band edge transmission power relaxation value.

The reference PCMAX denotes the virtual $P_{CMAX,c}(i)$ obtained by taking notice of zero power back-off and described above. If there is no PUSCH and PUCCH transmission, this means that transmission powers are not assigned to the corresponding channels and instead preset transmission formats referred to as virtual PUSCH and virtual PUCCH are applied according to an exemplary embodiment of the present invention.

Figure 7:
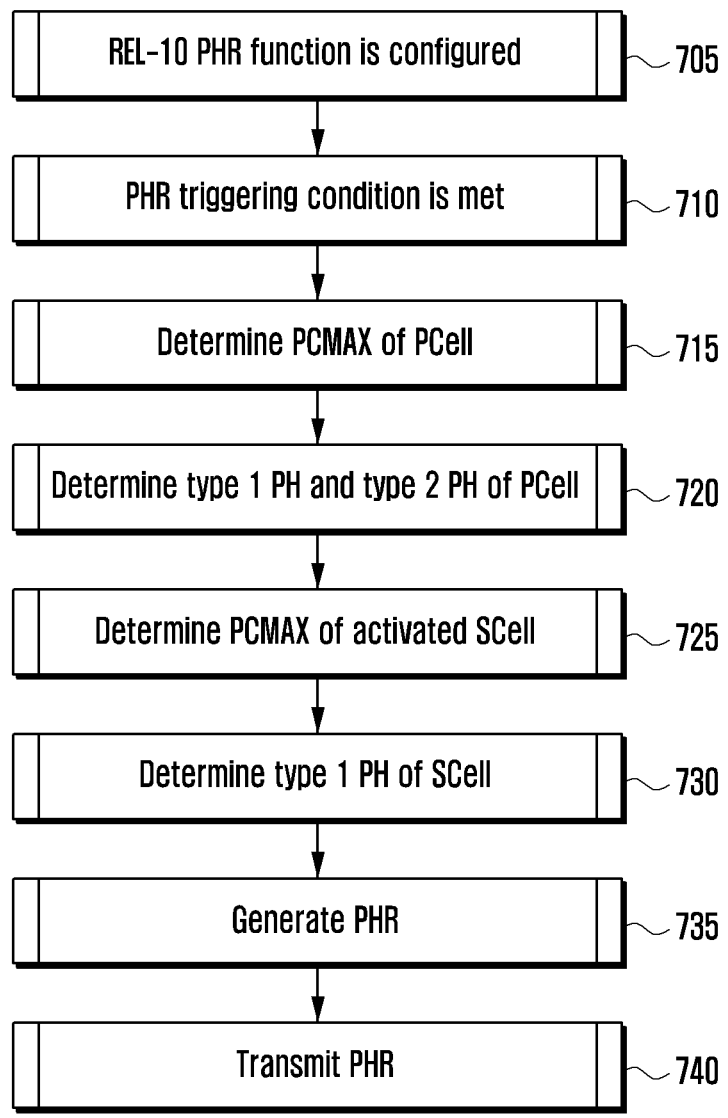
FIG. 7 is a flowchart illustrating a PH Report (PHR) transmission procedure according to an exemplary embodiment of the present invention.

FIG. 7 is a flowchart illustrating a PHR transmission procedure according to an exemplary embodiment of the present invention.

Referring to FIG. 7, the UE configures an extended PHR (i.e., a REL-10 PHR) in step 705. A PHR trigger condition is fulfilled in step 710. That is, if a prohibitPHR-Timer has elapsed and if displacement of a path loss on at least one of downlink carriers associated with corresponding uplink carriers is greater than a dl-PathLossChange, the PHR is triggered for all of the activated cells for which the uplink carriers are configured. The UE can trigger the PHR periodically and, if a new uplink transmission takes place after the REL-10 PHR configuration, the UE triggers the PHR for all of the activate serving cells configured with uplink carriers. The UE determines $P_{CMAX}$ of a PCell according to the above-described method in step 715. At this time, four transmission states are considered. The UE determines a type 1 PH and a type 2 PH of the PCell using $P_{CMAX}$ and PUSCH and PUCCH transmission powers in step 720. The UE determines the $P_{CMAX}$ of an activated SCell in step 725. The UE determines a type 1 PH of the SCell in step 730. If there is any uplink transmission in the corresponding SCell, the UE applies real $P_{CMAX}$ and real PUSCH powers and, otherwise, reference $P_{CMAX}$ and virtual PUSCH power to determine the type 1 PH. The UE configures the PHR including the PHs in step 735 and transmits the configured PHR in step 740.

Figure 8:
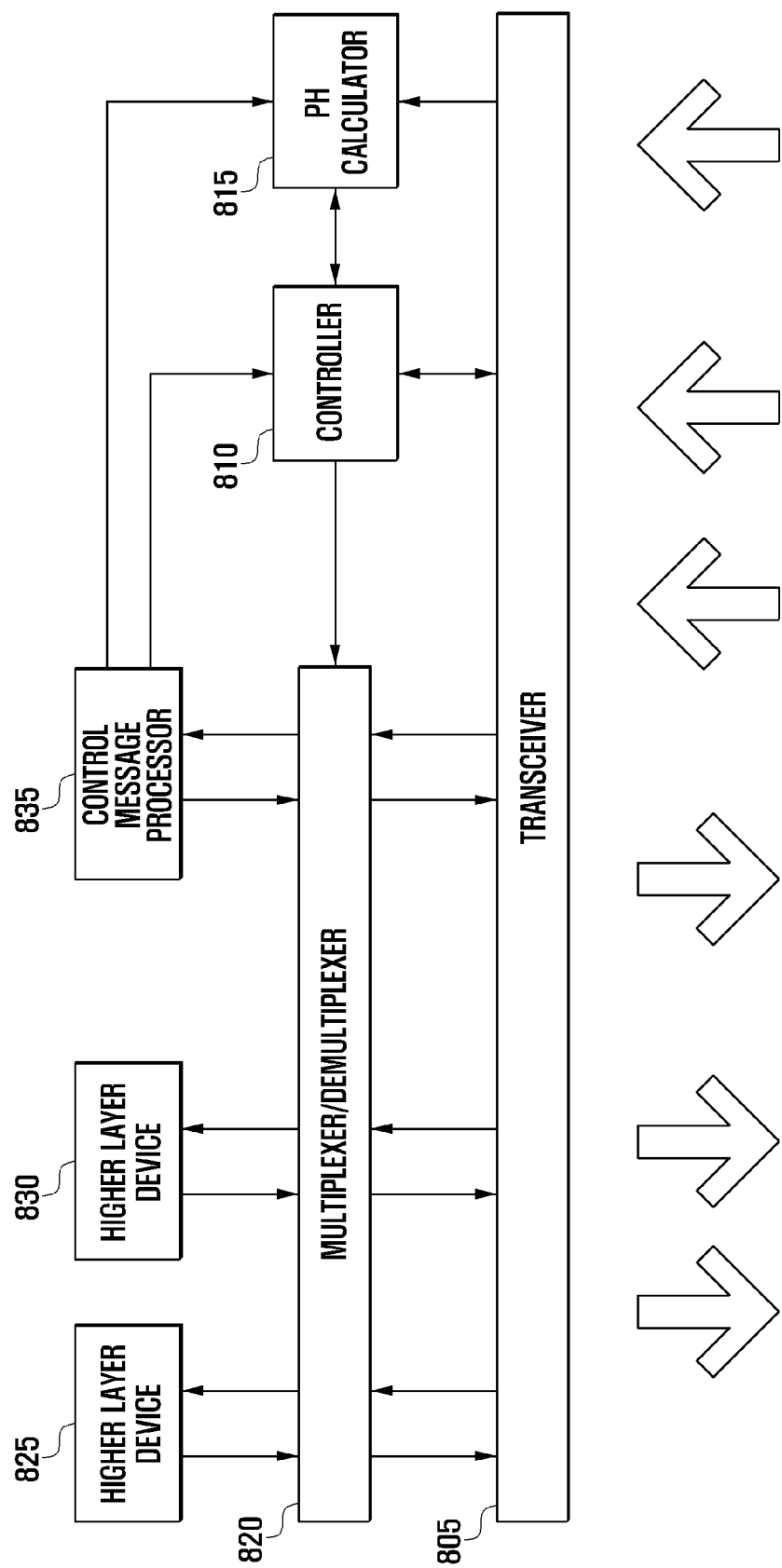
FIG. 8 is a block diagram illustrating a User Equipment (UE) according to an exemplary embodiment of the present invention.

FIG. 8 is a block diagram illustrating a UE according to an exemplary embodiment of the present invention.

Referring to FIG. 8, the UE includes a transceiver 805, a PH calculator 815, a controller 810, a multiplexer/demultiplexer 820, a control message processor 835, and various higher layer devices 825 and 830.

The transceiver 805 receives data and control signals on the downlink carriers and transmits data and control signals on the uplink carriers. In a case in which a plurality of carriers is aggregated, the transceiver 805 can transmit/receive the data and control signals over a plurality of carriers.

The controller 810 controls the multiplexer/demultiplexer 820 to generate MAC PDUs according to the control signal received by means of the transceiver 805, e.g., the scheduling information in an uplink. The controller detects the PHR trigger. If a PHR trigger is detected, the controller 810 controls the PH calculator 815 to determine the PH. Whether the PHR is triggered can be determined by verifying the PHR parameter provided by the control message processor 835. In a case in which the PHs of multiple uplink carriers are configured into a PHR, the controller 810 controls the multiplexer/demultiplexer 820 to place in the MAC PDU an indicator indicating whether the PH for each carrier is derived from a real $P_{CMAX}$ or a virtual $P_{CMAX}$. The controller 810 generates the PHR with the PHs provided by the PH calculator 815 and transmits the PHR to the multiplexer/demultiplexer 820. The PH calculator 815 determines the PH according to the control signal from the controller 810 and transmits the PH to the controller 810. In a case in which a plurality of carriers is aggregated, the PH calculator 815 can determine the PHs for the respective carriers, and especially the PH for the carrier having the PUSCH transmission being determined using the virtual $P_{CMAX}$.

The multiplexer/demultiplexer 820 multiplexes the data from the higher layer devices 825 and 830 and/or control message processor 835 and demultiplexes the data received by the transceiver 805 to the higher layer devices 825 and 830 and/or the control message processor 835.

The control message processor 835 processes the control message transmitted by the network and takes a necessary action. The control message processor 835 forwards the PHR parameter carried in the control message to the controller 810 or the information on newly activated carriers to the transceiver 805 to set the carriers. The higher layer devices 825 and 830 can be implemented for the respective services to deliver the data generated by the user service such as File Transfer Program (FTP) and VoIP to the multiplexer/demultiplexer 820 or process and deliver the data from the multiplexer/demultiplexer 820 to the service applications of the higher layer.

Although not depicted, the base station apparatus according to an exemplary embodiment of the present invention can include a transceiver, a controller, and a scheduler. The transceiver receives an extended PHR transmitted by a UE. The controller analyzes the extended PHR to verify the PH per serving cell. The scheduler allocates an uplink resource according to the PH per serving cell.

As described above, the PH calculation method and apparatus according to an exemplary embodiment of the present invention is capable of calculating PH for activated serving cell by taking notice of whether the activated serving cell has uplink transmission data and/or uplink control signal to be transmitted, thereby determining PH per activated serving cell more efficiently.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a base station in a wireless communication system, the method comprising:
   transmitting, to a terminal, a message for configuring a power headroom report (PHR) for one or more activated serving cells;
   receiving, from the terminal, the PHR; and
   determining one or more power headrooms (PHs) for the one or more activated serving cells based on the PHR,
   wherein the PHR includes a type two PH for a primary cell (PCell), a type one PH for the PCell, and at least one type one PH for one or more activated secondary cells (SCells), sequentially,
   wherein the type two PH is included in the PHR if simultaneous transmission of a physical uplink control channel (PUCCH) and a physical uplink shared channel (PUSCH) is configured,
   wherein a PH for an activated serving cell among the one or more activated serving cells is determined based on a maximum uplink transmission power, and
   wherein the maximum uplink transmission power is determined, without using a back-off parameter, based on at least one of a cell specific maximum allowed transmission power and a terminal specific maximum allowed transmission power, if the terminal does not transmit the PUSCH in a subframe for the activated serving cell.

2. The method of claim 1,
   wherein the PH for the activated serving cell is determined, if the terminal transmits the PUSCH with the PUCCH in the subframe, based on transmit power for the PUSCH and transmit power for the PUCCH, and
   wherein the PH for the activated serving cell is determined, if the terminal transmits the PUSCH without a PUCCH in the subframe, based on transmit power for the PUSCH and assumed transmit power for the PUCCH.

3. The method of claim 1,
   wherein the PH for the activated serving cell is determined, if the terminal does not transmit the PUSCH in the subframe, based on assumed transmit power for the PUSCH.

4. The method of claim 1,
   wherein the type one PH for the PCell and the type one PH for the SCell are determined without considering transmit power for the PUCCH.

5. A base station in a wireless communication system, the base station comprising:
   a transceiver configured to transmit and receive a signal; and
   a controller configured to:
      control the transceiver to transmit, to a terminal, a message for configuring a power headroom report (PHR) for one or more activated serving cells,
      control the transceiver to receive, from the terminal, the PHR, and
      determine one or more power headrooms (PHs) for the one or more activated serving cells based on the PHR,
   wherein the PHR includes a type two PH for a primary cell (PCell), a type one PH for the PCell, and at least one type one PH for one or more activated secondary cells (SCells), sequentially, wherein the type two PH is included in the PHR if simultaneous transmission of a physical uplink control channel (PUCCH) and a physical uplink shared channel (PUSCH) is configured, wherein a PH for an activated serving cell among the one or more activated serving cells is determined based on a maximum uplink transmission power, and wherein the maximum uplink transmission power is determined, without using a back-off parameter, based on at least one of a cell specific maximum allowed transmission power and a terminal specific maximum allowed transmission power, if the terminal does not transmit the PUSCH in a subframe for the activated serving cell.

6. The base station of claim 5, wherein the PH for the activated serving cell is determined, if the terminal transmits the PUSCH with the PUCCH in the subframe, based on transmit power for the PUSCH and transmit power for the PUCCH, and wherein the PH for the activated serving cell is determined, if the terminal transmits the PUSCH without a PUCCH in the subframe, based on transmit power for the PUSCH and assumed transmit power for the PUCCH.

7. The base station of claim 5, wherein the PH for the activated serving cell is determined, if the terminal does not transmit the PUSCH in the subframe, based on assumed transmit power for the PUSCH.

8. The base station of claim 5, wherein the type one PH for the PCell and the type one PH for the SCell are determined without considering transmit power for the PUCCH.

* * * * *